United States Patent [19]
Hamilton

[11] 3,791,669
[45] Feb. 12, 1974

[54] CONE ASPIRATING STRUCTURE FOR AIR CUSHION INFLATION

[75] Inventor: Brian K. Hamilton, Utica, Mich.

[73] Assignee: Allied Chemical Corporation, New York, N.Y.

[22] Filed: Aug. 16, 1972

[21] Appl. No.: 281,263

[52] U.S. Cl. ........................................ 280/150 AB
[51] Int. Cl. ............................................. B60r 21/10
[58] Field of Search 280/150 AB; 417/184, 179, 185, 417/191

[56] References Cited
UNITED STATES PATENTS

| | | | |
|---|---|---|---|
| 3,689,105 | 9/1972 | Matsui | 280/150 AB |
| 3,632,133 | 1/1972 | Hass | 280/150 AB |
| 3,624,810 | 11/1971 | Hass | 280/150 AB |
| 3,625,543 | 12/1971 | Wolff | 280/150 AB |
| 3,451,693 | 6/1969 | Carey | 280/150 AB |
| 280,212 | 6/1883 | Miles | 417/191 |
| 3,042,290 | 7/1962 | Fraebel | 417/184 X |

*Primary Examiner*—David Schonberg
*Assistant Examiner*—Terrance L. Siemens
*Attorney, Agent, or Firm*—Jonathan Plaut

[57] ABSTRACT

A gas bag assembly for vehicle occupant constraint upon impact of the vehicle. The gas bag assembly comprises an occupant protecting inflatable bag. The bag is partially filled with gas supplied by a gas source, such as stored gas or a gas generator, or a combination of the two, through a cone. The cone supplies gas to a diffuser which is in communication with the interior of the vehicle. Upon passage of inflating gas through the cone for inflation of the outer bag, the diffuser is supplied, because of pressure differential by the action of the cone on the gas from the source, with air from the interior of the vehicle by aspiration.

2 Claims, 3 Drawing Figures

CONE ASPIRATING STRUCTURE FOR AIR CUSHION INFLATION

BACKGROUND OF THE DISCLOSURE

The instant invention is directed to a vehicle gas bag assembly. More specifically, the instant invention is directed to gas bag assembly disposed in a vehicle for occupant constraint upon impact of the vehicle. More specifically, the instant invention is directed to a gas bag assembly in which a bag is inflated by gas from a stored or generated gas source, or a combination of the two, into a diffuser supplied through a cone, which in turn causes the drawing of air from the surroundings by aspiration into the diffuser.

The use of inflatable gas bags in vehicles, especially automobiles, has been proposed as an alternate means of constraining vehicle occupants in the event of an impact of the vehicle. At present, seat belts generally are employed for this purpose. Although seat belts provide excellent protection against serious injury, due to vehicle impacts and accidents, their use is voluntary. Thus, vehicle occupants often do not use seat belts. Ample evidence of their non-use is provided by the ever increasing toll of fatalities and serious injuries which occur each year on the nation's roads due to motor vehicle accidents.

In order to overcome this deficiency, it is proposed that seat belts be replaced with constraining means which does not require any positive act on the part of the occupant. A gas bag which is inflated upon impact automatically fits these requirements. A vehicle gas bag is practically instantaneously filled upon impact, constraining a vehicle occupant in his seat during the critical moments following impact.

The use of vehicle gas bags, however, has created new problems that have not as yet been totally resolved. Among these problems is the difficulty of providing adequate gas generating means to inflate the considerable volume of the several gas bags required in a vehicle. In the prior art, large volume requirements required the disposition of large compressed gas bottles and/or gas generators inside the vehicle. Furthermore, pyrotechnic gas generators may result in the generation of noxious gases.

A second problem created by the use of gas bags is the problem of passenger compartment pressurization. The rate of gas bag inflation, of necessity, is so rapid that escape of the pressurized air in the passenger compartment lags. Thus, the pressure in the compartment may increase in the critical moments following impact. This increase in pressure may result in damage to the passenger compartment of the vehicle. A second, if less apparent, danger of overpressurized passenger compartments lies in the increased sound generated. Gas bag inflation is accompanied by noise. Usually, this noise is within safety limits; however, increased pressure multiplies the noise level. Thus, if pressures in the passenger compartment are increased due to gas bag inflation, the noise associated with gas bag inflation exceeds tolerable levels.

United States applications Ser. No. 110,905, filed Jan. 29, 1971 and Ser. No. 252,686, filed May 12, 1972, and U.S. Pat. No. 3,632,133 provide for systems wherein compartment air is aspirated into the protective bag device. However, the apparatus of each to accomplish said aspiration is not simple in comparison to the apparatus of this invention and does not result in the positive advantages discussed above and hereinafter.

SUMMARY OF THE INVENTION

The instant invention is directed to a gas bag assembly which requires a minimum volume of generated gas while, at the same time, providing for simple aspiration of the passenger compartment of the vehicle to prevent pressure buildup therein.

In accordance with the instant invention, in a preferred embodiment a gas bag assembly, disposed in a vehicle, is provided with an occupant protecting bag in communication with a source of pressurized fluid or gas through a gas diffuser. The diffuser and the source of pressurized fluid, whether generated or stored or a combination of the two, are interconnected by a cone opening outwardly into the diffuser. The diffuser area adjacent to the mouth or cone opening thereinto is provided with means, such as apertures, to provide communication with the vehicle interior. Upon impact or crash condition of the vehicle, a source of pressurized gas inflates the bag, as supplied through the cone to the diffuser and then to the bag. Because of the flow of the gas through the cone in an ever increasing area, the pressure of the gas is lower when it reaches the diffuser than when it entered the cone. The resultant decreased pressure as the inflating gas enters the diffuser, which is even larger in area than the cone, results in aspiration of the air in the passenger compartment of the vehicle into the diffuser for supply then with the gas supplied through the cone into the bag.

BRIEF DESCRIPTION OF THE DRAWINGS

The instant invention may be better understood by reference to the accompanying drawings of which.

DETAILED DESCRIPTION

Figure 1:
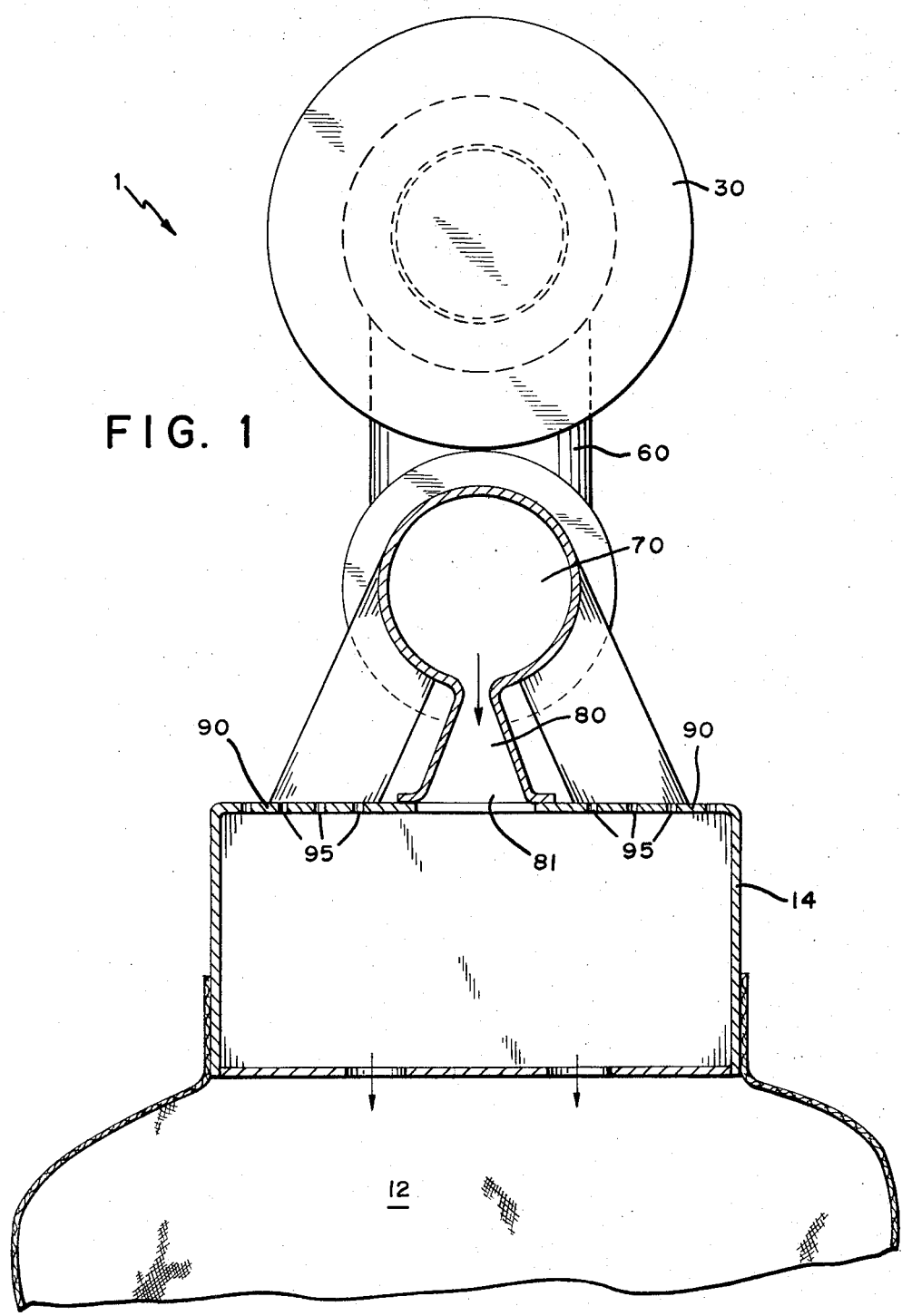
FIG. 1 is an end plan sectional view of the gas bag assembly of the instant invention.

Referring to the Figures of the drawing, the gas bag assembly of the instant invention is generally indicated at 1. It comprises a bag 12. In a preferred embodiment, the material of construction of the bag 12 is nylon composition. Other flexible, high strength materials may, alternately, be used instead of nylon.

The bag 12 is preferably disposed about a diffuser 14. The diffuser 14 is provided with openings leading into the bag for uniform inflation of the bag. The diffuser 14 is supplied with pressurized gas from a gas source 30 with which the diffuser 14 is in communication. It should be appreciated that any of the many gas sources, such as stored gas, gas generators, or a combination or the two, that have been proposed as a vehicle gas bag inflator means, may be used in combination wth the gas bag assembly of the instant invention, but the invention is most advantageous where the gas supplied to the diffuser 14 is at least in part a generated gas from say, generator 30.

Figure 2:
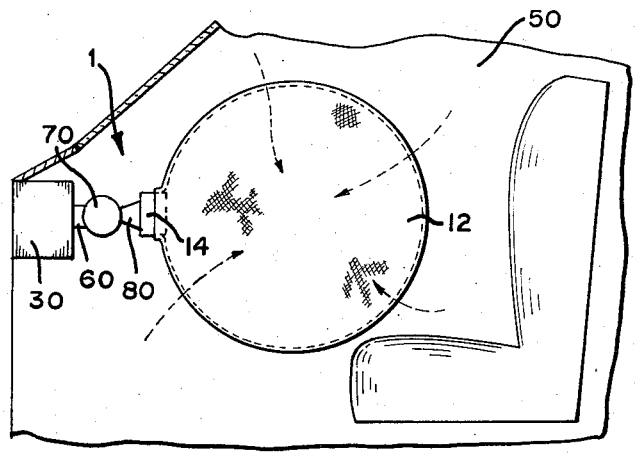
FIG. 2 is an end view of the assembly of FIG. 1, as mounted in the vehicle compartment.

As illustrated in the drawings, the source 30 is connected through an elbow 60 to a manifold 70, which is in turn connected to the diffuser 14 through a cone 80 opening to its widest portion at its mouth 81 into the diffuser 14. The diffuser 14, at least in one portion thereof, is in contact with the atmosphere environment in the vehicle compartment 50 (FIG. 2), so that compartment air may be aspirated into the inner bag on expansion, as will be hereinafter discussed, from the compartment environment atmosphere, as shown in FIG. 2 by the dotted air current arrows. The diffuser 14 includes apertured section or sections 90, symmetric about the adjacent cone 80 which are open or permeable to connect the diffuser with the vehicle compartment therethrough. Flaps 94 cover the opening apertured section 90, shown in FIG. 3, to permit ingress of compartment air into the diffuser until the pressure differential is eliminated, at which time the flaps, preferably under their own bias, cover the openings.

In example, the movement of the air supplied for the source through the cone to the diffuser lowers the pressure in the diffuser adjacent the sections 90 from, in one embodiment, about 100 psi to about 7 psi and causes a pressure differential which draws compartment air through the adjacent diffuser openings to fill the bag.

Figure 3:
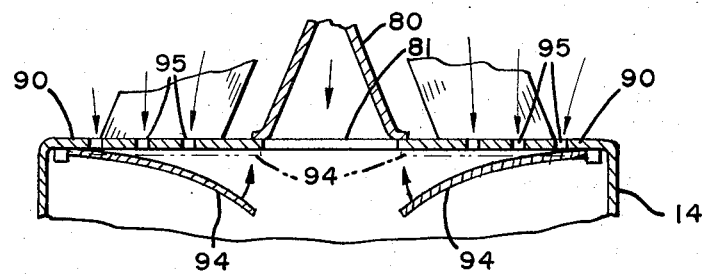
FIG. 3 shows a detail of the invention.

Flaps 94 normally cover the apertured sections 90, as shown in phantom in FIG. 3, see apertures 95, but uncover the apertures on a pressure gradient creating pressure conditions to allow pulled or aspirated air into the diffuser through the apertures, as will be discussed.

In operation, impact of the vehicle results in rapid release of gas from the gas source to the diffuser 14 to which it is in communication. The flow of gas through the cone into the diffuser 14 causes a decreased pressure at the mouth of the cone, where it meets the diffuser, and thus a pressure gradient appears. Due to the higher pressure in the passenger compartment, an inflow of air from the passenger compartment through the apertures adjacent and into the bag occurs.

It should be appreciated that the above-described preferred embodiments of the instant invention are meant to be illustrative only. The foregoing specification and drawings will make apparent various modifications which are within the scope of the instant invention. Therefore, the scope of the instant invention should be limited only by the appended claims.

What is claimed is:

1. A gas bag assembly disposed in the passenger compartment of a vehicle, comprising:
   a. an inflatable bag connected to a diffuser;
   b. a conical inlet means in communication with a source of pressurized gas;
   c. said diffuser connected to and in communication with said inlet means at its end of greatest perimeter;
   d. sections of said diffuser symmetric about and adjacent said inlet means apertured for aspiration of and passage of compartment air therethrough and supply to said bag;
   e. said sections each covered by an impermeable flexible flap in the diffuser and under predetermined pressure conditions uncovered, said flaps biased to normally cover the associated apertured section.

2. A gas bag assembly as set forth in claim 1, there being two apertured sections, each section containing a plurality of apertures.

* * * * *